US009053632B2

(12) United States Patent
Shen et al.

(10) Patent No.: US 9,053,632 B2
(45) Date of Patent: Jun. 9, 2015

(54) REAL-TIME TRAFFIC PREDICTION AND/OR ESTIMATION USING GPS DATA WITH LOW SAMPLING RATES

(75) Inventors: Wei Shen, Danville, CA (US); Laura Wynter, Westport, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 365 days.

(21) Appl. No.: 13/537,277

(22) Filed: Jun. 29, 2012

(65) Prior Publication Data

US 2014/0005916 A1 Jan. 2, 2014

(51) Int. Cl.
*G06F 19/00* (2011.01)
*G06G 7/70* (2006.01)
*G08G 1/01* (2006.01)

(52) U.S. Cl.
CPC .................................... *G08G 1/0129* (2013.01)

(58) Field of Classification Search
None
See application file for complete search history.

(56) References Cited

U.S. PATENT DOCUMENTS

| | | | | |
|---|---|---|---|---|
| 7,508,321 | B2 * | 3/2009 | Gueziec et al. | 340/905 |
| 7,519,564 | B2 * | 4/2009 | Horvitz | 706/12 |
| 8,065,073 | B2 * | 11/2011 | Downs et al. | 701/117 |
| 8,090,524 | B2 * | 1/2012 | Chapman et al. | 701/117 |
| 8,150,611 | B2 * | 4/2012 | Mukherjee | 701/118 |
| 2007/0135990 | A1 * | 6/2007 | Seymour et al. | 701/117 |
| 2007/0208492 | A1 * | 9/2007 | Downs et al. | 701/117 |
| 2007/0208494 | A1 * | 9/2007 | Chapman et al. | 701/117 |
| 2007/0208495 | A1 * | 9/2007 | Chapman et al. | 701/117 |
| 2007/0208496 | A1 * | 9/2007 | Downs et al. | 701/117 |
| 2007/0208497 | A1 * | 9/2007 | Downs et al. | 701/117 |
| 2008/0046165 | A1 * | 2/2008 | Downs et al. | 701/117 |
| 2008/0071465 | A1 * | 3/2008 | Chapman et al. | 701/117 |
| 2008/0071466 | A1 * | 3/2008 | Downs et al. | 701/117 |
| 2008/0303693 | A1 * | 12/2008 | Link, II | 340/905 |
| 2010/0082226 | A1 * | 4/2010 | Mukherjee | 701/118 |
| 2011/0082636 | A1 * | 4/2011 | Barker et al. | 701/118 |
| 2011/0173015 | A1 * | 7/2011 | Chapman et al. | 705/1.1 |

FOREIGN PATENT DOCUMENTS

| | | | |
|---|---|---|---|
| CN | 101964941 | A | 2/2011 |
| CN | 102157063 | A | 8/2011 |
| JP | 2006226977 | A | 8/2006 |
| JP | 2007156912 | A | 6/2007 |
| TW | 201000934 | A | 1/2010 |

OTHER PUBLICATIONS

Biem et al., "IBM InfoSphere Streams for Scalable, Real-Time, Intelligent Transportation Services", SIGMOD'10, Indianapolis, IN, Jun. 2010, pp. 1093-1103.
Shen et al., "Traffic Velocity Prediction Using GPS Data: IEEE ICDM Contest Task 3 Report", ICDMW '10 Proceedings of the 2010 IEEE International Conference on Data Mining Workshops, IEEE Computer Society Washington, DC, pp. 1369-1371.
Alt et al., "Matching planar maps", Elsevier Journal of Algorithms 49, 2003, pp. 262-283.
http://trid.trb.org/view.aspx?id=711583, "Matching GPS Observations to Locations on a Digital Map", printed Jan. 2, 2014.
Hoh et al., "Virtual Trip Lines for Distributed Privacy-Preserving Traffic Monitoring", 2008, pp. 1-14.
Min et al., "Road Traffic Prediction with Spatio-Tempral Correlations", 2007, pp. 1-12.

* cited by examiner

*Primary Examiner* — Bhavesh V Amin
(74) *Attorney, Agent, or Firm* — Scully, Scott, Murphy & Presser, P.C.; Daniel P. Morris, Esq.

(57) ABSTRACT

The present disclosure relates generally to real-time traffic prediction and/or estimation using GPS data with low sampling rates. In various examples, real-time traffic prediction and/or estimation using GPS data with low sampling rates may be implemented in the form of systems, methods and/or algorithms.

13 Claims, 7 Drawing Sheets

REAL-TIME TRAFFIC PREDICTION AND/OR ESTIMATION USING GPS DATA WITH LOW SAMPLING RATES

BACKGROUND

The present disclosure relates generally to real-time traffic prediction and/or estimation using global positioning system ("GPS") data with low sampling rates.

In various examples, real-time traffic prediction and/or estimation using GPS data with low sampling rates may be implemented in the form of systems, methods and/or algorithms.

GPS-based speed information offers real-time data, which for that reason alone, should be leveraged for traffic estimation and/or prediction.

However the speeds indicated by the GPS records are often faulty and should not be used for traffic estimation and/or prediction as such without fear of significant inducement of error.

In particular, due to the nature of GPS records to typically come at regular intervals, low speeds will be sampled far more frequently than higher speeds, leading to a bias towards low speeds (more records) and often to the detriment of determining the true values.

Most sources of GPS-based speed records rely on sampled data that does not permit true trajectory calculation.

Various embodiments described herein are addressed at this need and this market.

DESCRIPTION OF RELATED ART

GPS devices (e.g., in-vehicle devices and smartphones) produce signals that can be used (in principle) for determining traffic speeds (as well as location).

Companies that receive GPS location-based signals include GOOGLE, smartphone application developers and in-vehicle navigation companies, such as TOM TOM and GARMIN.

In many cases, not enough data points in any given time period on a given stretch of road (or link) are available.

In addition, due to random sampling so as to avoid tracking individual drivers (sometimes legally required), records are sparser still.

In such cases, speed data deduced from the GPS-based information is typically unreliable (e.g., determining traffic speeds from groups of drivers who provide only sampled instantaneous speed records is often very inaccurate).

Hence, prediction cannot typically be accomplished in an effective manner from such data.

FIGS. 1A and 1B show a comparison of the actual speed profile (from traffic sensors) and conventionally calculated GPS signal samples on a sample critical link during one simulation cycle. More particularly, FIG. 1A shows actual link speed vs. average speed of GPS sample points (6 minute time intervals) and FIG. 1B shows number of GPS sample points during each 6-min interval.

Similarly, FIGS. 2A and 2B show a comparison of the actual speed profile (from traffic sensors) and conventionally calculated GPS signal samples on a sample critical link during another simulation cycle. More particularly, FIG. 2A shows actual link speed vs. average speed of GPS sample points (6 minute time intervals) and FIG. 2B shows number of GPS sample points during each 6-min interval.

Furthermore, it is often the case that more GPS signals are obtained on links with low speeds, due to the higher probability of multiple reads from any given vehicle when the vehicle is not moving or moving very slowly.

As such, using only the GPS data, one would predict far more low speeds than higher (and often true) speeds.

In this regard, FIG. 3 shows another comparison of actual link speed vs. conventionally calculated predicted link speed.

Finally, it is noted that some traffic estimation products exist in the marketplace to determine traffic "color maps" for GPS-enabled mobile phones equipped with dedicated applications that transmit periodically locations to a server (see, e.g., a GOOGLE map with the "traffic" added to it, where the road segments that are fluid are overlaid with green bars, congested with red bars and the links that are in-between are overlaid with yellow bars).

SUMMARY

In various examples, real-time traffic prediction and/or estimation using GPS data with low sampling rates may be implemented in the form of systems, methods and/or algorithms.

In other examples, real-time traffic prediction and/or estimation using GPS data with low sampling rates may be implemented using a data mining approach.

In one embodiment, a method for determining traffic speeds related to at least one vehicle traveling in a transportation network is provided, the method comprising: receiving a plurality of real-time GPS-based speed records, wherein the real-time GPS-based speed records relate to real-time vehicle speeds in the transportation network; receiving a plurality of historical speed records from a secondary source of speed data, wherein the historical speed records relate to historical vehicle speeds in the transportation network and wherein the historical speed records cover a time period; determining a first characteristic of real-time GPS-based speed records of a first type; determining a second characteristic of real-time GPS-based speed records of a second type, wherein the speed records of the first type indicate a higher speed than the speed indicated by the speed records of the second type; determining a third characteristic of a combination of the real-time GPS-based speed records of the first type and the second type; determining, for each of a plurality of sub-time periods included in the time period, a fourth characteristic of historical speed records of the first type; determining, for each of the plurality of sub-time periods included in the time period, a fifth characteristic of historical speed records of the second type; determining, for each of the plurality of sub-time periods included in the time period, a sixth characteristic of a combination of the historical speed records of the first type and the second type; and determining traffic speeds related to the at least one vehicle traveling in the transportation network from the historical speed records of a selected one of the plurality of sub-time periods, wherein the selected one of the plurality of sub-time periods is chosen as the period in which a combination of the first, second and third characteristics is most similar to a combination of the fourth, fifth and sixth characteristics.

In another embodiment, a program storage device readable by machine, tangibly embodying a program of instructions executable by the machine for determining traffic speeds related to at least one vehicle traveling in a transportation network is provided, the program of instructions, when executing, performing the following steps: receiving a plurality of real-time GPS-based speed records, wherein the real-time GPS-based speed records relate to real-time vehicle speeds in the transportation network; receiving a plurality of historical speed records from a secondary source of speed data, wherein the historical speed records relate to historical vehicle speeds in the transportation network and wherein the historical speed records cover a time period; determining a first characteristic of real-time GPS-based speed records of a first type; determining a second characteristic of real-time GPS-based speed records of a second type, wherein the speed records of the first type indicate a higher speed than the speed indicated by the speed records of the second type; determining a third characteristic of a combination of the real-time GPS-based speed records of the first type and the second type; determining, for each of a plurality of sub-time periods included in the time period, a fourth characteristic of historical speed records of the first type; determining, for each of the plurality of sub-time periods included in the time period, a fifth characteristic of historical speed records of the second type; determining, for each of the plurality of sub-time periods included in the time period, a sixth characteristic of a combination of the historical speed records of the first type and the second type; and determining traffic speeds related to the at least one vehicle traveling in the transportation network from the historical speed records of a selected one of the plurality of sub-time periods, wherein the selected one of the plurality of sub-time periods is chosen as the period in which a combination of the first, second and third characteristics is most similar to a combination of the fourth, fifth and sixth characteristics.

In another example, a computer-implemented system for determining traffic speeds related to at least one vehicle traveling in a transportation network is provided, the system comprising: a receiving element that receives: (a) a plurality of real-time GPS-based speed records, wherein the real-time GPS-based speed records relate to real-time vehicle speeds in the transportation network; and (b) a plurality of historical speed records from a secondary source of speed data, wherein the historical speed records relate to historical vehicle speeds in the transportation network and wherein the historical speed records cover a time period; a calculation element in operative communication with the receiving element, wherein the calculation element determines: (a) a first characteristic of real-time GPS-based speed records of a first type; (b) a second characteristic of real-time GPS-based speed records of a second type, wherein the speed records of the first type indicate a higher speed than the speed indicated by the speed records of the second type; (c) a third characteristic of a combination of the real-time GPS-based speed records of the first type and the second type; (d) for each of a plurality of sub-time periods included in the time period, a fourth characteristic of historical speed records of the first type; (e) for each of the plurality of sub-time periods included in the time period, a fifth characteristic of historical speed records of the second type; (f) for each of the plurality of sub-time periods included in the time period, a sixth characteristic of a combination of the historical speed records of the first type and the second type; and (g) traffic speeds related to the at least one vehicle traveling in the transportation network from the historical speed records of a selected one of the plurality of sub-time periods, wherein the selected one of the plurality of sub-time periods is chosen as the period in which a combination of the first, second and third characteristics is most similar to a combination of the fourth, fifth and sixth characteristics; and an output element in operative communication with the calculation element, wherein the output element outputs the determined traffic speeds related to the at least one vehicle traveling in the transportation network from the historical speed records of the selected one of the plurality of sub-time periods.

BRIEF DESCRIPTION OF THE DRAWINGS

Various objects, features and advantages will become apparent to one skilled in the art, in view of the following detailed description taken in combination with the attached drawings, in which.

DETAILED DESCRIPTION

Figure 1A:
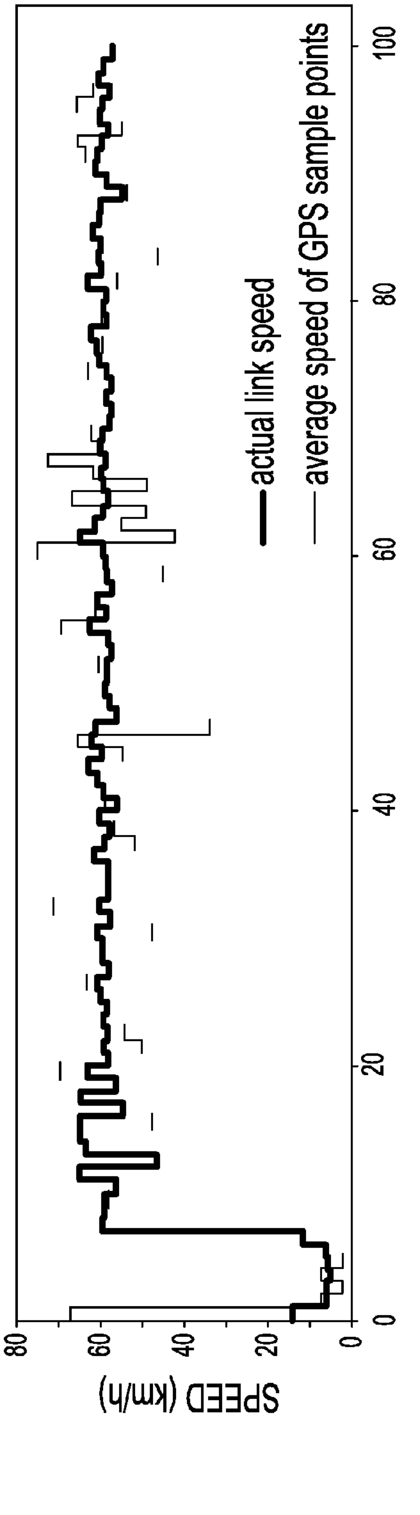
FIG. 1A (PRIOR ART)
FIGS. 1A and 1B show a comparison of the actual speed profile (from traffic sensors) and conventionally calculated GPS signal samples on a sample critical link during one simulation cycle.
Figure 1B:
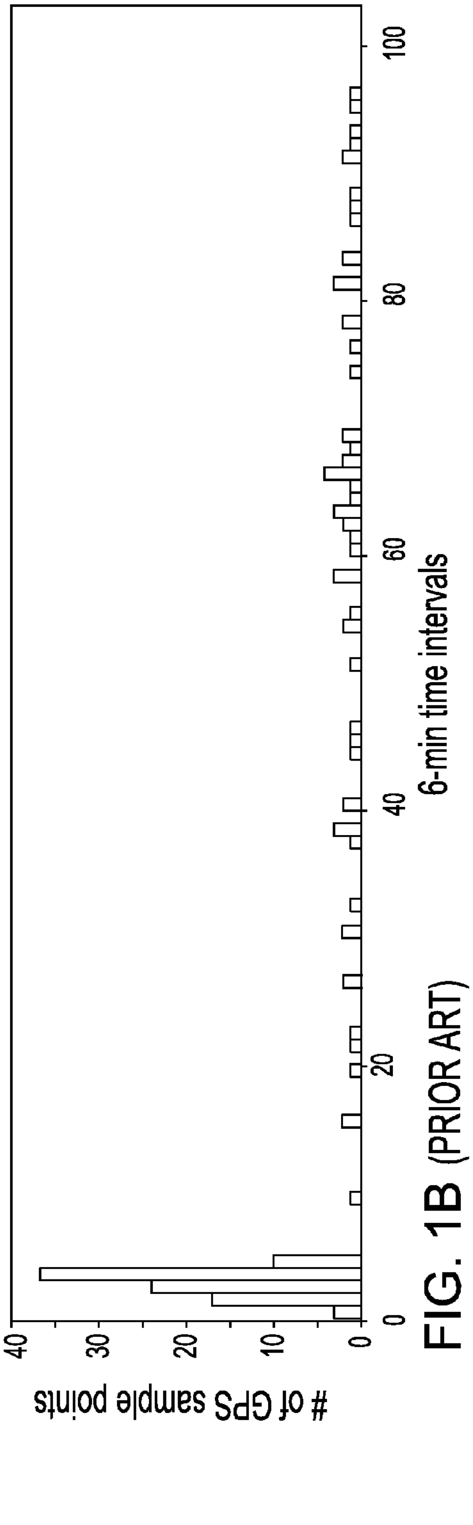
FIG. 1B (PRIOR ART)
Figure 2A:
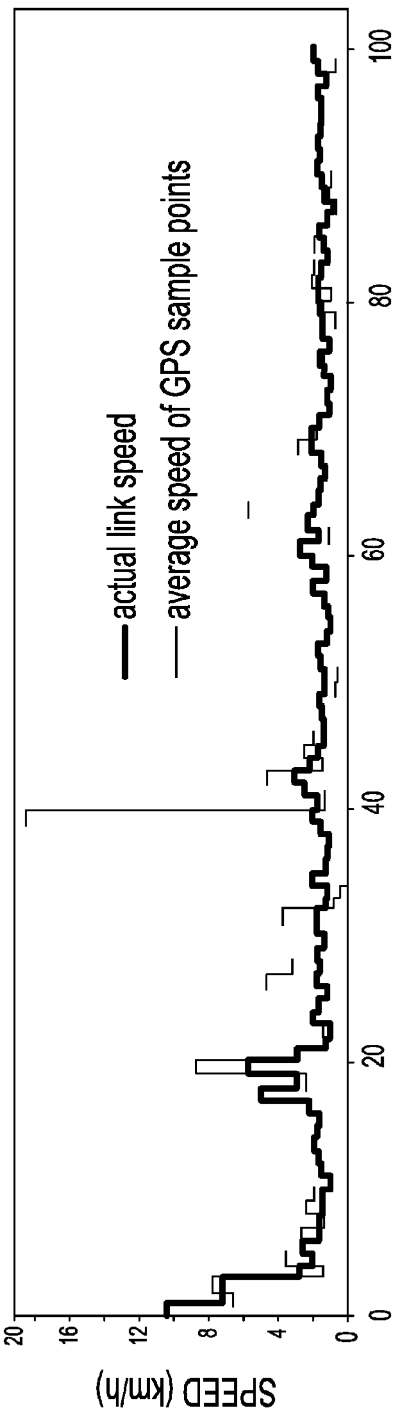
FIG. 2A (PRIOR ART)
FIGS. 2A and 2B show another comparison of the actual speed profile (from traffic sensors) and conventionally calculated GPS signal samples on a sample critical link during another simulation cycle.
Figure 2B:
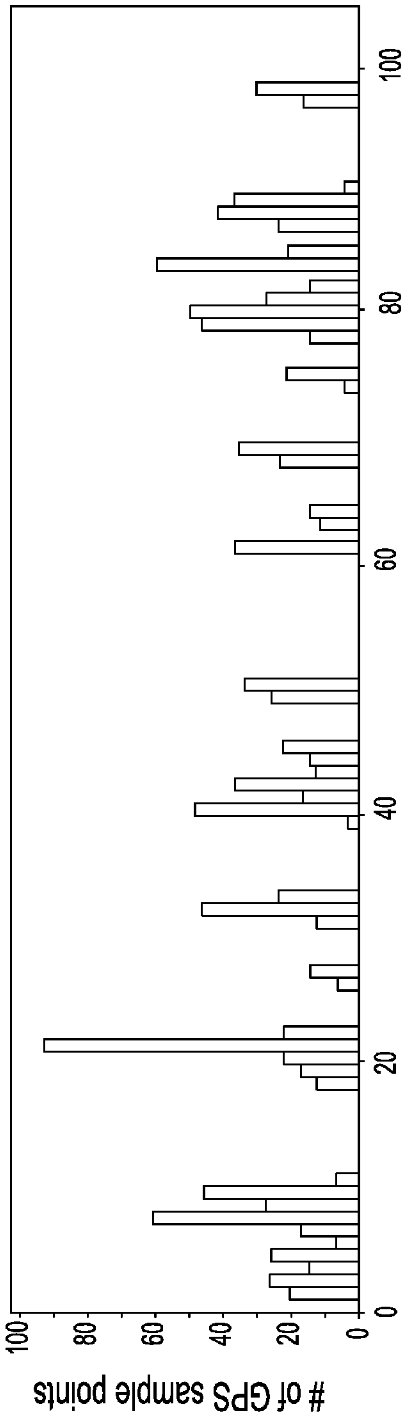
FIG. 2B (PRIOR ART)
Figure 3:
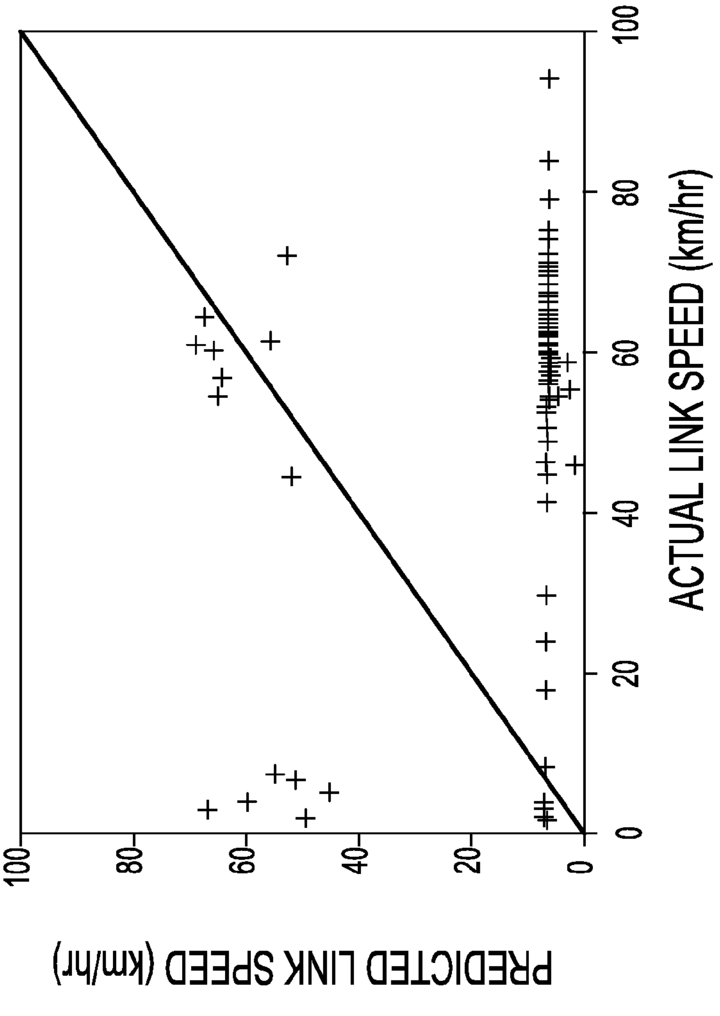
FIG. 3 (PRIOR ART)
FIG. 3 shows another comparison of actual link speed vs. conventionally calculated predicted link speed.

For the purposes of description the term "real-time" is intended to refer to cause and effect occurring approximately contemporaneously in time (e.g., without significant time lag between cause and effect but not necessarily instantaneously).

For the purposes of description the term "historical" is intended to refer to non-real-time (e.g., having a significant time lag between cause and effect (such as many minutes, hour or days)).

For the purposes of description the term "point speeds" is intended to refer to a record of a vehicle speed from a GPS device and a location (i.e. point) at which the speed value is considered valid.

For the purposes of description the term "trajectories" is intended to refer to paths or successive collections of locations traversed by a vehicle, typically comprised of a few (e.g., 3-5) individual location records taken at successive points in time (e.g. every 20 seconds).

For the purposes of description the term "probe vehicle" is intended to refer to a vehicle equipped with a GPS device and transmitting to a central location its speed and location at consecutive points in time.

For the purposes of description the term "harmonic average speeds" is intended to refer to a form of averaging often used for values that correspond to rates (speed, interest rate, etc.) and defined as the reciprocal of the arithmetic (usual) mean taken of the reciprocals of the rates (here, of the speeds).

Real-time road traffic prediction is a critical component in modern smart transportation systems. With reliable prediction of near-term traffic condition in road networks, traffic management agencies can generate proactive traffic operation strategies to alleviate congestion and disseminate accurate travel time estimates to road users.

In the past two decades, enormous research efforts have been invested in developing accurate and robust traffic prediction models. The modeling approaches can be roughly classified into parametric methods and non-parametric methods.

Overall, most approaches are designed primarily for traffic prediction based on fixed location data sources such as inductive loops, roadside radar sensors, and traffic cameras which report traffic measure (i.e., flow/occupancy/speed) for each location continuously. To take into account the spatial and temporal correlations of traffic flow, the traffic measurement during the current time interval and several intervals in the past on both the link of interest and its neighboring links are used to formulate a univariate/multivariate linear/nonlinear prediction problem.

Fixed location traffic sensors are commonly seen in freeway segments. However, for most arterial networks in large urban cities where smart transportation technologies are mostly needed, such fixed location data sources are usually very sparse or unavailable. Even if some data may be extracted from detectors which are deployed mainly for other applications (e.g., signal control systems), the quality of such data may vary dramatically among different locations. Nowadays, many onboard mobile devices (e.g., smart phones, GPS guidance devices, etc.) have GPS components, which offer a new valuable data source for filling in this gap. GPS receiver devices provide detailed location, speed, trajectory and travel time information, which may potentially be very useful for real-time traffic prediction.

There are two major challenges for using GPS data in traffic prediction. First, disclosing detailed vehicular trajectory data is always associated with privacy and security concerns. Even if trajectory data is broadcast in an anonymous manner by replacing personal information with a randomly chosen ID, it is still potentially possible to re-identify individuals from the trajectory data A major way of bypassing this issue is to collect GPS measurements only in sampled (e.g., random) time/location/devices so that vehicular trajectories cannot be inferred. One example of such an approach is the Virtual Trip Line proposed by [Hoh, B., M. Gruteser, R. Herring, J. Ban, D. Work, J. C. Herrera, and A. Bayen. Virtual trip lines for distributed privacy-preserving traffic monitoring. In The Six Annual International Conference on Mobile Systems, Applications and Services (MobiSys 2008), Breckenridge, U.S.A., June 2008], which are essentially spatial triggers for GPS devices to collect and report measurements when pre-defined virtual lines in the network are crossed. The data collection procedure used in association with certain data disclosed herein is similar in nature to the idea of Virtual Trip Line. A difference is that sampling is performed on devices rather than on locations. More specifically, for each given interval, only a sampled collection of GPS devices report their location and speed information.

The second challenge is that traditional traffic prediction methods which are based on reliable traffic observations from fixed locations are usually inapplicable in this context. As known, the proportion of vehicles with onboard GPS devices whose drivers agree to disclose their travel information among the entire population of traffic is typically very low, not to mention that some sampling may have to be done due to privacy concerns. On a collection of critical links of interest in a study network, the appearance of those vehicles during each time interval is even lower. Therefore, it is extremely difficult to obtain good estimation and prediction of link traffic speed based on such limited samples.

To address the aforementioned challenges and help design an overall paradigm for traffic prediction using GPS data, some knowledge and insights learned from the 2010 IEEE International Conference on Data Mining Series (ICDM) Contest of TomTom Traffic Prediction for Intelligent GPS Navigation was applied.

As described herein, GPS devices, as an emerging mobile traffic data source, offer new opportunities for short-term traffic prediction, especially in arterial networks where traditional fixed-location sensors are sparse or unavailable. A major challenge is that time-series traffic prediction methods based on fixed location data sources is usually inapplicable, due to the relatively low GPS sampling rates. Using simulated GPS data from the 2010 ICDM traffic prediction competition, it is demonstrated herein that a data mining approach centered at the K-nearest-neighbor method performs quite well in this context. Elements of approaches according various embodiments include the neighboring distance criterion considering both local and global GPS counts information, the ensemble rule, and the cross-validation framework. Valuable insights for traffic prediction with GPS data in reality are provided: Instead of depending solely on GPS sampled speed readings for link-level speed prediction, more reliable predictions can be achieved by combining GPS data with another data source which collects link speed during short time periods periodically. Within such a data framework, a major contribution of GPS data comes from both the local and global count information instead of its speed readings.

Reference will now be made to certain key elements of an approach according to an embodiment. More particularly, reference will now be made to a "K-nearest neighbor model".

In this regard, a typical effective approach for real-life road traffic prediction is through specialized auto-regressive models in which measurements of the traffic on the link of interest as well as on certain neighboring links are used as input (see, e.g., Min, W. & Wynter, L. (2011), 'Real-time road traffic prediction with spatio-temporal correlations', Transportation Research Part C 19 (4), 606-616). Unfortunately, that method does not work well for all data sets (e.g., the simulated GPS data from the 2010 ICDM traffic prediction competition), due in a large part to the following reasons:

(1) The relatively low GPS sampling rate (1% overall) makes it impossible to construct reliable historical speed profiles for all the links. For example, for each of the selected 100 links of interest, the total number of GPS points during the first half an hour vary from 0 to 934, with mean=17 and standard deviation=53.2. In fact, 22 links among the 100 selected road segments have no GPS data points at all.

(2) The actual average link velocity provided by a certain file of the training data shows that the simulated speed profile on the 100 links typically involves sudden drops or sudden rises.

Instead, presented is a completely different approach to predict the traffic speeds from the GPS points. This new approach works by constructing a K-nearest neighbor model to predict vehicle velocity. Namely, for each test time period (e.g., an hour), training periods are picked that are most similar to the test period and are used during each period as its estimate.

In this example, the following two criteria are used to construct the similarity measure (while hour and minute times are discussed in this example, any appropriate time periods and intervals may be used):

1) Global similarity $S_{ij}^g$:$S_{ij}^g$ measures how close the total number of GPS counts in one test hour is to that of a training hour. The total number of GPS points in the network reflects the overall congestion level of the entire network, and hence is a good indicator of whether an hour is during the "warming-up" period of a cycle or not. To construct $S_{ij}^g$, let $c_i^t$ and $C_j^t$ be the total number of GPS points received during every 1-min interval t=1, . . . , 30 of test hour i=1, . . . , 500 and training hour/=1, . . . , 500, respectively. The global similarity between a test hour i and a training hour j, denoted as $S_{ij}^{g}$ is measured by the root mean squared error (RMSE) of $c_i^t$ and $C_j^t$. Namely, $$S_{ij}^{g} = \sqrt{\frac{\sum_{t=i}^{so} (c_i^t - c_j^t)^2}{30}} \quad (1)$$

2) Local similarity $S_{ijk}^{l1}$ and $S_{ijk}^{l2}$. Comparing the GPS records with the actual harmonic average speed provided in the training data, it was found that during a 6-min interval on a selected road segment, the speed of one probe vehicle can be significantly different from another. For instance, one GPS record may show a speed instance of zero while another one may report speed=60 km/hr. The huge variance in sample speed is partly due to the discrete feature of the traffic simulator. As a result, the harmonic average velocity of probe vehicles does not generally lead to reliable velocity estimates. In fact, it is often impossible to take the harmonic mean of the speed of the probe vehicles, as many probe vehicles report speed values of zero in the GPS data. Nevertheless, the average link speed and GPS data on the link do exhibit a strong correlation as follows: typically, links with low speed have many more GPS records with zero values, whereas links with high speeds are more likely to have nonzero GPS records. This observation motivated the construction of a local similarity measure based on the total number of GPS records with zero and nonzero values on any link k of interest. Hence, the local similarity $S_{ijk}^{l1}$ and $S_{ijk}^{l2}$ measuring the similarity of a test hour i, i=1, . . . , 500 and a training hour j, j=1, . . . , 500 on link k, k=1, . . . , 100, is computed as follows:

$$S_{ijk}^{l1} = |pik - Pjk|, S_{ijk}^{l2} = |qik - Qjk| \quad (2)$$

Where pi and Pj are the total number of GPS records with zero values during the first half of test hour i and training hour j, respectively;

qi and Qj are the total number of GPS records with nonzero values during the first half of test hour i and training hour j, respectively.

Given link k=1, . . . , 100 and test hour i=1, . . . , 500, the actual similarity measure $S_{ijk}$ $S_{jk}$ for each training hour j=1, . . . , 500 is computed as the weighted sum of the ranks of the global similarity and the local similarities. Namely, $$S_{ijk} = \alpha_k \mathrm{rank}(S_{ij}^{g}) + \beta_k \mathrm{rank}(S_{ijk}^{l1}) + \gamma_k \mathrm{rank}(S_{ijk}^{l2}) \quad (3)$$

Note that the rank of a training hour is measured by its position when the corresponding similarity measure for all training hours is sorted in ascending order.

Finally, the harmonic average speeds of the first and last 6-min intervals of the second half of each test hour are estimated as the weighted harmonic average speeds of the corresponding intervals of the K most similar training hours. The inverse of the similarity metric of each candidate training hour is used as the weight. In fact, three potential estimators, the arithmetic mean, the median, and the harmonic mean, may be used during construction of a solution.

When using the harmonic mean of the K nearest neighbors, if all the candidate hours in the neighbor list have high speed except for a few small outliers, the harmonic mean can be very small. The existence of such cases contributes to quite a significant portion of the error. To avoid the outlier effect, a conditional trimmed harmonic mean is used by filtering out the rare small outliers when most of the neighbors have high velocity values.

As described herein, a similarity measure can be defined (e.g. as in Equation 1) between two vectors by taking an aggregate function of the differences of the two vectors, in the manner of the norm of the differences or as in Equation (1) as the root-mean-squared difference. Essentially it amounts to taking the distance between two vectors. Larger such differences indicate lower similarity and vice-versa.

Reference will now be made to an example Evaluation Framework. For each link k of interest, the K nearest neighbors disclosed herein with the outlier filter has seven parameters in total: 1) K—the total number of neighbors used in constructing the velocity estimate; 2) $\alpha_k$—weight of the global similarity measure; 3) $\beta_k$—weight of the local congestion similarity measure; 4) $\gamma_k$—weight of the local free flow similarity measure; 5) $n_k$—the total number of high speed neighbors for the outlier filter to be initiated; 6) $h_k$—the high cut-off value of the outlier filter; 7) $l_k$—the low cut-off value of the outlier filter. All of the above parameters may be optimized heuristically using, e.g., a 5-fold cross validation framework. A set of parameters are regarded as optimal if the set generated the best average performance over, for example, five test-training data sets. Finally, the link-specific optimal parameter settings may be applied to the real test data to obtain the final solution. It was found that it was often the case that the actual performance measure (e.g., 7.4556 Min/km) on the real test data set is slightly better than the average best performance measure (e.g., 7.74 Min/km) from the cross validation. This is understandable as cross validation of this example only used ⅘ of the training data.

Figure 4:
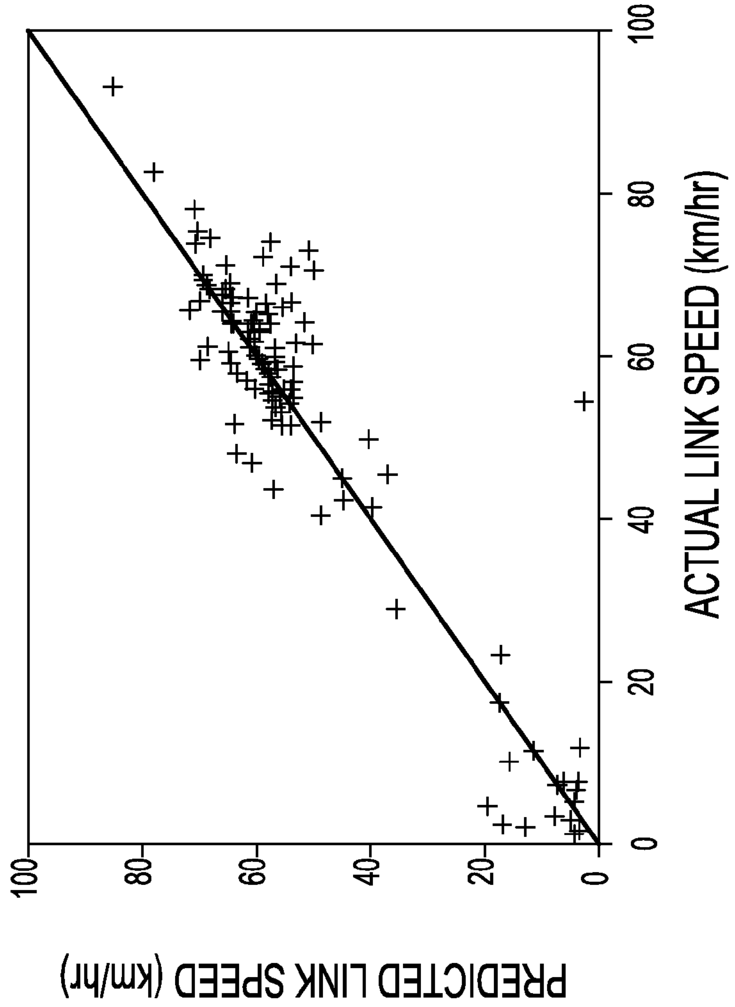
FIG. 4 shows much higher fidelity of the traffic speed predictions (or estimates, in general) that are provided by various embodiments (as opposed to the conventional use of the GPS speed records).

As seen in FIG. 4, this embodiment provides much higher fidelity of the traffic speed predictions (or estimates, in general) than the conventional use of the GPS speed records.

In another embodiment, an OVERALL S including the RANK functions may include one or more of the following terms: mean and/or variance and/or a ratio of high speed records to low speed records (or low to high). Inside the RANK functions of terms may be the analogous expression to S_{ij}^{11) into which may be put the ABSOLUTE VALUE of the difference between the term in the historical sample and the term in the real-time sample.

Figure 5A:
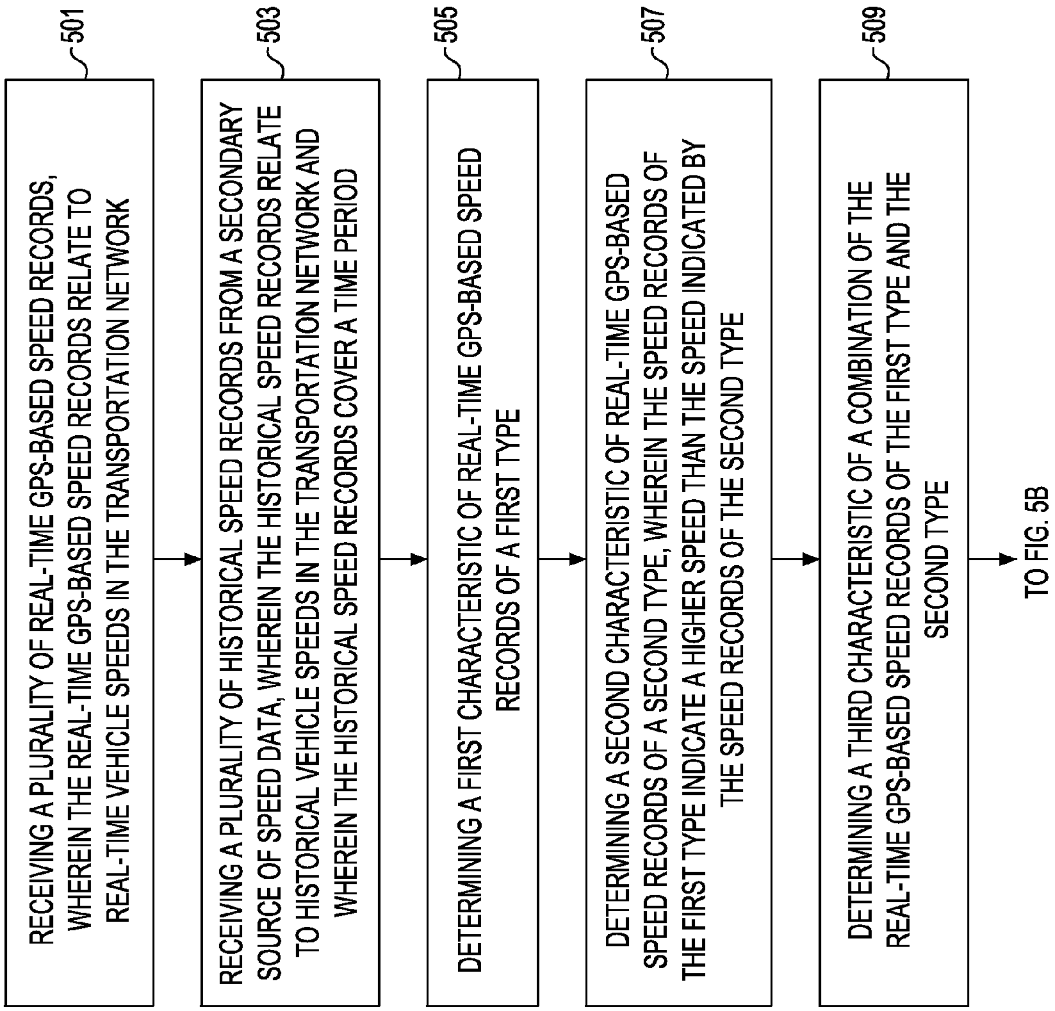
FIGS. 5A and 5B depict a flowchart of a method according to one embodiment.
Figure 5B:
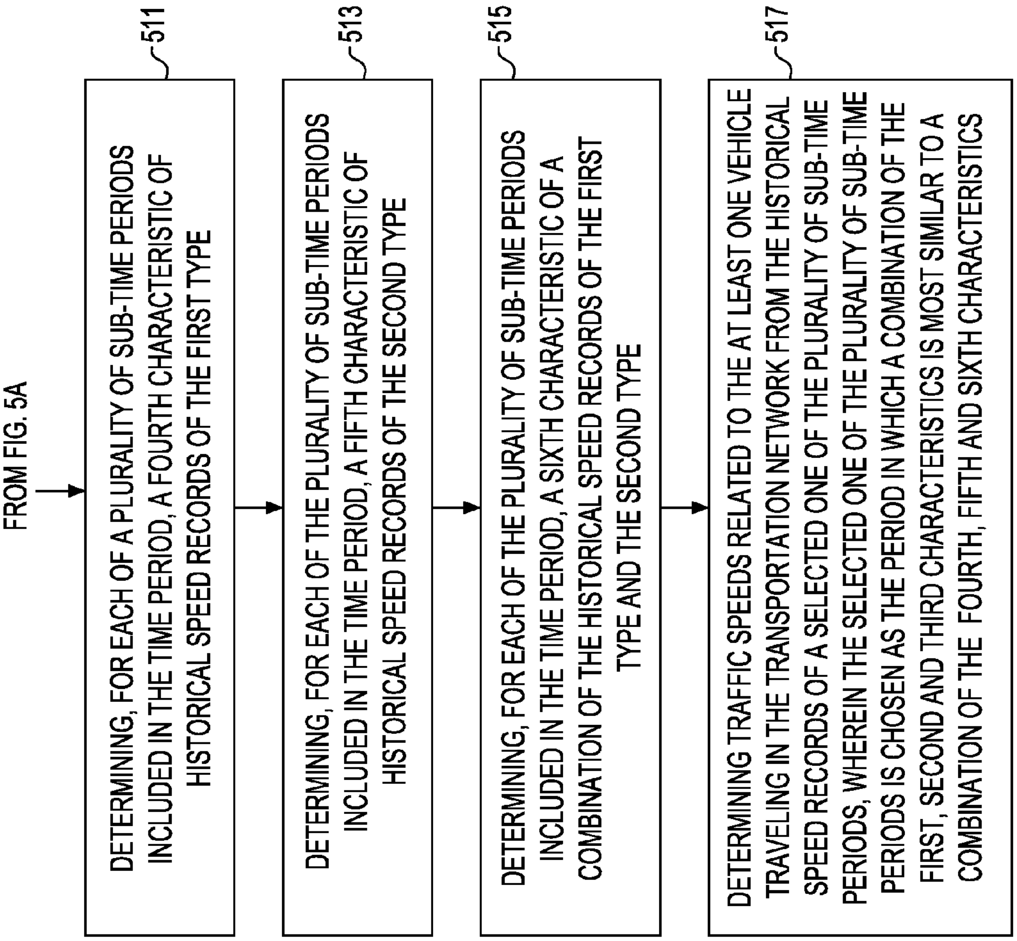

Referring now to FIGS. 5A and 5B, a method (e.g., implemented in a computer system) for determining traffic speeds related to at least one vehicle traveling in a transportation network according to an embodiment is shown. As seen in these FIGS. 5A and 5B, the method of this embodiment comprises: Step 501—receiving a plurality of real-time GPS-based speed records, wherein the real-time GPS-based speed records relate to real-time vehicle speeds in the transportation network; Step 503-receiving a plurality of historical speed records from a secondary source of speed data, wherein the historical speed records relate to historical vehicle speeds in the transportation network and wherein the historical speed records cover a time period; Step 505—determining a first characteristic of real-time GPS-based speed records of a first type; Step 507—determining a second characteristic of real-time GPS-based speed records of a second type, wherein the speed records of the first type indicate a higher speed than the speed indicated by the speed records of the second type; Step 509—determining a third characteristic of a combination of the real-time GPS-based speed records of the first type and the second type; Step 511—determining, for each of a plurality of sub-time periods included in the time period, a fourth characteristic of historical speed records of the first type; Step 513—determining, for each of the plurality of sub-time periods included in the time period, a fifth characteristic of historical speed records of the second type; Step 515—determining, for each of the plurality of sub-time periods included in the time period, a sixth characteristic of a combination of the historical speed records of the first type and the second type;

and Step 517—determining traffic speeds related to the at least one vehicle traveling in the transportation network from the historical speed records of a selected one of the plurality of sub-time periods, wherein the selected one of the plurality of sub-time periods is chosen as the period in which a combination of the first, second and third characteristics is most similar to a combination of the fourth, fifth and sixth characteristics.

In one example, traffic speeds related to a plurality of vehicles traveling in a transportation network may be determined.

In one example, traffic speeds related to one or more vehicles traveling in a transportation network on one or more links may be determined.

In one example, determining traffic speeds comprises estimating existing traffic speeds.

In another example, determining traffic speeds comprises predicting future traffic speeds.

In another example, the first type comprises speed records having a relatively higher speed and the second type comprises speed records having a relatively lower speed.

In another example, the number of real-time GPS-based speed records at or above a threshold speed value may be determined; the number of real-time GPS-based speed records below the threshold speed value may be determined; the number of historical speed records at or above the threshold speed value may be determined; and the number of historical speed records below the threshold speed value may be determined.

In another example, the number of real-time GPS-based speed records above a threshold speed value may be determined; the number of real-time GPS-based speed records at or below the threshold speed value may be determined; number of historical speed records above the threshold speed value may be determined; and the number of historical speed records at or below the threshold speed value may be determined.

In another example, the steps may be carried out in the order recited or the steps may be carried out in another order.

Figure 6:
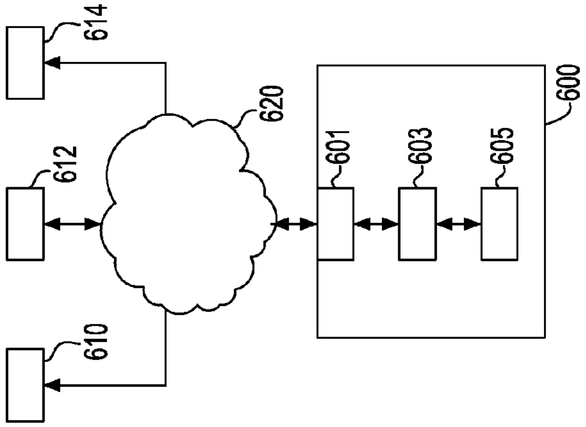
FIG. 6 depicts a block diagram of a system according to one embodiment.

Referring now to FIG. 6, a block diagram according to one embodiment is shown. As seen in this FIG. 6, a computer-implemented system 600 for determining traffic speeds related to a transportation network may comprise: receiving element 601 that receives: (a) a plurality of real-time GPS-based speed records, wherein the real-time GPS-based speed records relate to real-time vehicle speeds in the transportation network; and (b) a plurality of historical speed records from a secondary source of speed data, wherein the historical speed records relate to historical vehicle speeds in the transportation network and wherein the historical speed records cover a time period.

Further, as seen in this FIG. 6, the computer-implemented system for determining traffic speeds related to the at least one vehicle traveling in a transportation network may comprise: calculation element 603 in operative communication with the receiving element 601, wherein the calculation element 603 determines: (a) a first characteristic of real-time GPS-based speed records of a first type; (b) a second characteristic of real-time GPS-based speed records of a second type, wherein the speed records of the first type indicate a higher speed than the speed indicated by the speed records of the second type; (c) a third characteristic of a combination of the real-time GPS-based speed records of the first type and the second type; (d) for each of a plurality of sub-time periods included in the time period, a fourth characteristic of historical speed records of the first type; (e) for each of the plurality of sub-time periods included in the time period, a fifth characteristic of historical speed records of the second type; (f) for each of the plurality of sub-time periods included in the time period, a sixth characteristic of a combination of the historical speed records of the first type and the second type; and (g) traffic speeds related to the at least one vehicle traveling in the transportation network from the historical speed records of a selected one of the plurality of sub-time periods, wherein the selected one of the plurality of sub-time periods is chosen as the period in which a combination of the first, second and third characteristics is most similar to a combination of the fourth, fifth and sixth characteristics.

Further, as seen in this FIG. 6, the computer-implemented system for determining traffic speeds related to a transportation network may comprise: an output element 605 in operative communication with the calculation element 603, wherein the output element 605 outputs the determined traffic speeds related to the at least one vehicle traveling in the transportation network from the historical speed records of the selected one of the plurality of sub-time periods.

In one example, the output element outputs the determined traffic speeds related to the at least one vehicle traveling in the transportation network from the historical speed records of the selected one of the plurality of sub-time periods to at least one of: (a) a display monitor; (b) a digital file; and (c) a printer.

In one example, traffic speeds related to a plurality of vehicles traveling in a transportation network may be determined.

In one example, traffic speeds related to one or more vehicles traveling in a transportation network on one or more links may be determined.

Still referring to FIG. 6, it is seen that receiving element 601 may receive data from a real-time source of GPS data 610 (although one such source is shown, any desired number of sources may be utilized; in addition, any given source may aggregate data from a plurality of GPS data producing units). Further, it is seen that receiving element 601 may receive data from a database 612 containing GPS data (although one such database is shown, any desired number of databases may be utilized; in addition, any given database may aggregate data from a plurality of GPS data producing units). Further still, it is seen that receiving element 601 may receive data from a database 614 containing historic data, which may be non-GPS data (although one such database is shown, any desired number of databases may be utilized; in addition, any given database may aggregate data from a plurality sources).

Still referring to FIG. 6, it is seen that receiving element 601 may receive data via communication channel 620 such as over a wired or wireless communications network. Communication channel 620 may comprise a wireless and/or wired communication channel. In one specific example, communication channel 620 may be the Internet.

Figure 7:
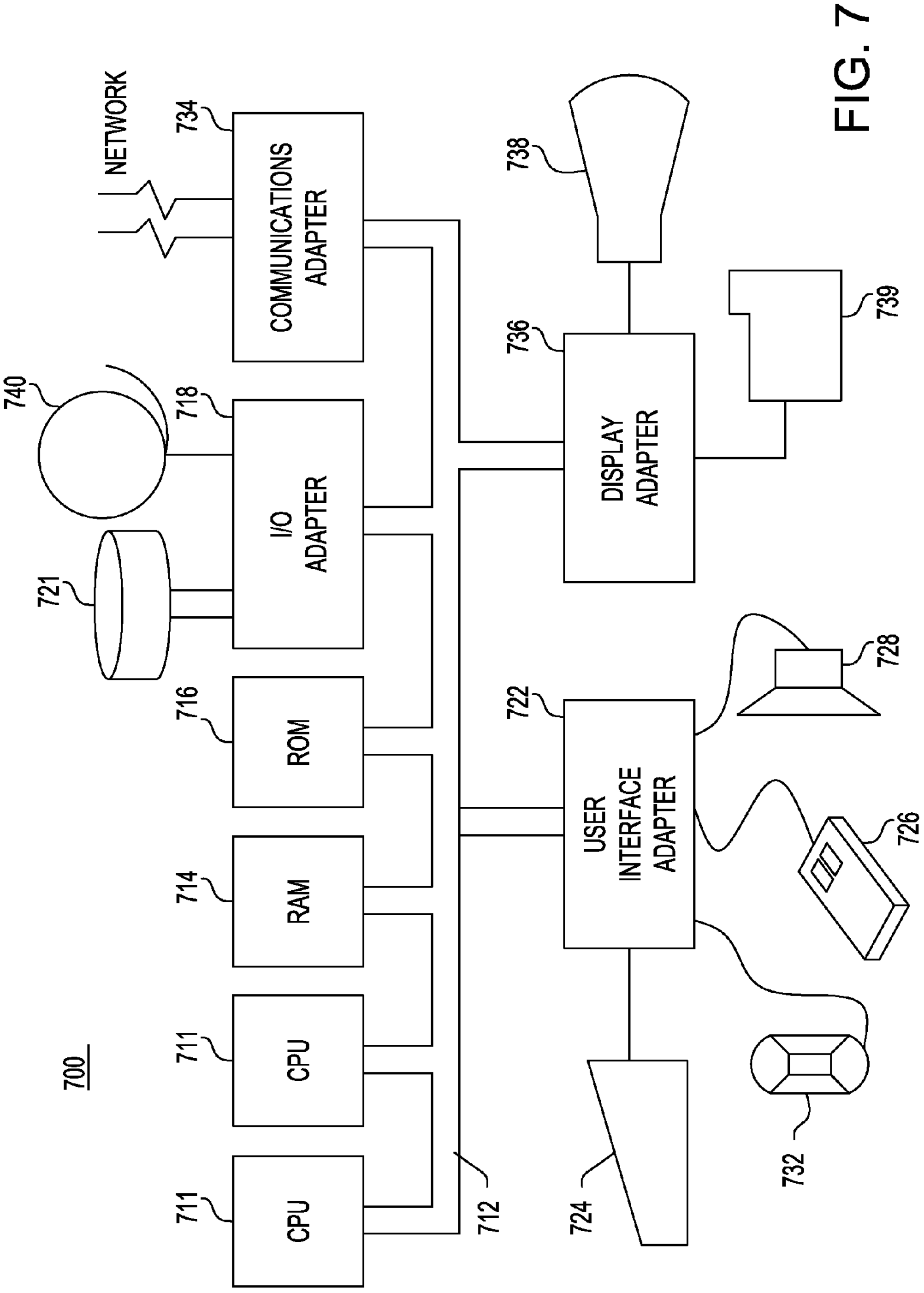
FIG. 7 depicts a block diagram of a system according to one embodiment.

Referring now to FIG. 7, this Fig. shows a hardware configuration of computing system 700 according to an embodiment. As seen, this hardware configuration has at least one processor or central processing unit (CPU) 711. The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communications adapter 734 for connecting the system 700 to a data processing network, the Internet, an Intranet, a local area network (LAN), etc., and a display adapter 736 for connecting the bus 712 to a display device 738 and/or printer 739 (e.g., a digital printer or the like).

As described herein, one embodiment makes use of GPS devices, as an emerging mobile traffic data source, for, e.g., short-term traffic prediction. In one example, such a short-term may be about 1 hour in advance. In another example, such short-term may be up to about 1.5 or 2 hours maximum in advance. Various examples utilize: (a) a data mining approach centered at the K-nearest-neighbor method; (b) both local and global GPS counts information, the ensemble rule, and the cross-validation framework; (c) combining GPS data with a minor data source which collects link speed during short time periods periodically; and/or (d) GPS data that comes from both the local and global count information instead of speed readings.

As described herein, one embodiment makes use of a global similarity measure that assesses the total number of counts across the network. One such example is shown in Equation (1) above for a 30-minute period. In short, this global similarity measure assesses the overall congestion of a period with the current period, and is not limited to the road link in question, but rather to a region (hence, global).

Further, this embodiment also makes use of a link-specific measure that assesses the similarity of the number of low-valued and higher-valued counts of the current time period with each historical one. One such example is shown in Equation (2) above.

Finally, in this embodiment the rank of a time period is determined by a formula that combines the above measures using their ranks and then estimates weights using the average-case data. One such example is shown in Equation (3) above.

One specific example will now be described. In this example, the received historical speed records may cover a time period (e.g., 5 years). Further, various characteristics of the historical speed records may be determined for each of a plurality of sub-time periods (e.g., one day) within the full 5-year time period. Further still, traffic speeds related to the transportation network may be determined from the historical speed records of a selected one of the plurality of sub-time periods (e.g. Apr. 1, 2012), wherein the selected one of the plurality of sub-time periods (e.g. Apr. 1, 2012) is chosen as the period in which a combination of the first, second and third characteristics is most similar to a combination of the fourth, fifth and sixth characteristics (of course, the dates, time periods, sub-time periods and the like are intended as examples, and any desired dates, time periods, sub-time periods and the like may be utilized—for example, time periods of years, months or days may be used and sub-time periods of days, hours or minutes may be used).

In another specific example, since the speed measurements themselves may not typically be accurate for speeds above very low values, the full set of records is divided into two sets, low speeds and higher speeds. A determination is made of the number of records in each set during each time interval, on each link. These numbers are called "counts", and the two sets of counts may be used as the basis for various calculations.

To complement the counts, an additional set of data may be used, which may not be available in real time and/or not on all links at all times. This additional data may be the "average speed" for a given link at a given time period. In some cases, such an average speed may cover multiple time periods due to its more aggregate nature.

Other embodiments described herein may make use of a nearest neighbor paradigm.

Still other embodiments may use the approach of utilizing counts (rather than the actual speed record values) from the GPS data, along with a "similarity metric".

In still other embodiments, techniques from data mining may be combined with traffic speed estimates available from other sources.

In various embodiments, the inaccuracy related to sampled instantaneous speed records may be overcome (fully or partially) and the ability to obtain better predictions and/or estimates of real-time traffic speeds may be provided.

In various embodiments, quantitative traffic prediction produces a set of future speeds on the various road links, rather than the types of ranges produced for use on "color maps".

In various embodiments, the mechanism goes beyond real-time traffic estimation to future traffic prediction, which in general requires more data than the real-time estimation problem.

In various embodiments a system, method and algorithm for estimating traffic speeds for a transportation network from GPS-based speed records and a secondary source of speed data for the same network is provided. In these embodiments, the counts of the number of speed records of at least two types is employed and the similarity between the number of speed records of said types and historical numbers of speeds records of each type is assessed and the most similar is used to determine the estimated traffic speed from the corresponding secondary source of speed data.

In various embodiments a system, method and algorithm for predicting future traffic speeds for a transportation network from GPS-based speed records and a secondary source of speed data for the same network is provided. In these embodiments, the counts of the number of speed records of at least two types is employed and the similarity between the number of speed records of said types and historical numbers of speeds records of each type is assessed and the most similar is used to determine the future predicted traffic speed from the corresponding secondary source of speed data.

In one specific example, the two types of speed records are very low speeds and higher speeds. In another specific example, the lower speeds could be zero (or close to zero) and the higher speeds could be higher than the lower speeds (e.g., non-zero). In another specific example, the lower speed could be below 10 mph and the higher speeds could be above the lower speeds.

In another specific example, any characteristic may be any desired mathematical function of a respective value.

In other examples, near-term prediction of traffic speeds may be performed for selected road links.

In other examples, a GPS-based hybrid approach may provide for real-time traffic prediction and/or estimation by combining techniques from data mining with traffic speed estimates available from one or more other sources.

In other examples, GPS data may be considered that is provided in the form of point speeds, rather than trajectories (such point speeds, rather than trajectories, are conventionally used, for example, when sampling of GPS data from consumers is used by a service provider, such as to protect privacy of the consumers).

In another example, the total number of GPS counts with zero velocity on each link may be used as a major component of local similarity.

In another example, the harmonic mean of the nearest neighbors (instead of the arithmetic mean or median) may be taken as an estimate.

In other examples, the secondary source of data may comprise information on average travel speeds for the links of interest, which may have been obtained from other sources but not available as a fixed-sensor-based real-time data feed.

In other examples, each GPS record contains a timestamp, latitude and longitude coordinates, and the instantaneous speed of the sampled vehicle. Before any prediction model is applied, a procedure may be used to map GPS location to the road segments on the network. Since GPS data are generally noisy, the reported coordinates may not necessarily fall precisely on any link. Map-matching algorithms [e.g., "Matching GPS observations to locations on a digital map" (J. Greenfeld), 81th Annual Meeting of the Transportation Research Board (2002) Volume: 1, Issue: 3, Publisher: Mendeley Ltd., Pages: 164-173, "Matching Planar Maps" (H. Alt, A. Efrat, G. Rote, and C. Wenk), Journal of Algorithms 49: 262-283, 2003] may therefore be needed to accurately approximate the location of the GPS points on the links.

In other examples, historical data may carry valuable information for predicting future traffic conditions during the analogous time intervals.

In other examples, a hybrid approach may be utilized: a long-running data source with broad coverage but low sampling rate (e.g., GPS records) along with another periodic short-term data source which collects traffic observations (e.g., on critical links) may be combined to generate reliable traffic predictions/estimations. In one specific example, during calibration periods, actual link speed observations on (e.g., critical links) are collected. Together with the GPS data received during the same period, these data are stored as prediction/estimation candidates. The GPS records received in real-time can then be used to determine which prediction/estimation candidate is most appropriate.

In another example, the global GPS count may carry valuable information for determining the link level traffic condition.

Another example may operate as follows: selecting from the historical link-level speed observations the K most similar hours and using a linear combination of the corresponding speed observations as prediction/estimation values. Parameters of the selection criterion and the coefficients of the values in the weighted average may be optimized through a 5-fold cross-validation framework. The final predictions/estimations may then be generated by grouping several solutions generated by different neighboring criterions.

In another example, both the overall sample counts of GPS records and the link-level GPS counts may carry valuable information for determining the link-level traffic state. Therefore, the nearest-neighbor distance criterion that may be used in the prediction/estimation model may be constructed by taking into account both a global and a local similarity index.

In another example, there may be some flexibility in constructing the estimator. For example, in the global similarity measure, a time aggregation granularity other than 1 minute may be used. When combining solutions from the K nearest neighbors, besides harmonic mean, other choices may include arithmetic mean, median, etc. The final solution may be, for example, an ensemble of six different estimators constructed from combinations of two time granularity levels (1 min and 6 min) and three different aggregation methods (arithmetic mean, median, and harmonic mean). In addition, for the ensemble, the weight for each estimator may be determined.

In other examples, various embodiments may operate offline, online or a combination of both.

In other examples, various embodiments may operate using one or more sources of traffic data (e.g., historical traffic data).

In other examples, GPS location and/or speed data may be collected from a plurality of individual vehicles.

In other examples, any steps described herein may be carried out in any appropriate desired order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. The containment (or storage) of the program may be non-transitory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A method implemented using a computer for determining traffic speeds related to at least one vehicle traveling in a transportation network, the method comprising:

receiving by the computer a plurality of real-time GPS-based speed records, wherein the real-time GPS-based speed records relate to real-time vehicle speeds in the transportation network;

receiving by the computer a plurality of historical speed records from a secondary source of speed data, wherein the historical speed records relate to historical vehicle speeds in the transportation network and wherein the historical speed records cover a time period;

determining by the computer a first characteristic of real-time GPS-based speed records of a first type;

determining by the computer a second characteristic of real-time GPS-based speed records of a second type, wherein the speed records of the first type indicate a higher speed than the speed indicated by the speed records of the second type;

determining by the computer a third characteristic of a combination of the real-time GPS-based speed records of the first type and the second type;

determining by the computer, for each of a plurality of sub-time periods included in the time period, a fourth characteristic of historical speed records of the first type;

determining by the computer, for each of the plurality of sub-time periods included in the time period, a fifth characteristic of historical speed records of the second type;

determining by the computer, for each of the plurality of sub-time periods included in the time period, a sixth characteristic of a combination of the historical speed records of the first type and the second type; and determining by the computer traffic speeds related to the at least one vehicle traveling in the transportation network from the historical speed records of a selected one of the plurality of sub-time periods, wherein the selected one of the plurality of sub-time periods is chosen as the period in which a combination of the first, second and third characteristics is most similar to a combination of the fourth, fifth and sixth characteristics;

wherein the first characteristic is a count of real-time GPS-based speed records of the first type;

wherein the second characteristic is a count of real-time GPS-based speed records of the second type;

wherein the third characteristic is one of: (a) a ratio of: a count of real-time GPS-based speed records of the first type to a count of real-time GPS-based speed records of the second type; (b) a mean value of a combination of the real-time GPS-based speed records of the first and second types; and (c) a variance value of a combination of the real-time GPS-based speed records of the first and second types;

wherein the fourth characteristic is a count of historical speed records of the first type;

wherein the fifth characteristic is a count of historical speed records of the second type;

wherein the sixth characteristic is one of: (a) a ratio of: a count of historical speed records of the first type to a count of historical speed records of the second type; (b) a mean value of a combination of historical speed records of the first and second types; and (c) a variance value of a combination of historical speed records of the first and second types; and wherein the period in which a combination of the first, second and third characteristics is most similar to a combination of the fourth, fifth and sixth characteristics is determined by utilizing a weighted sum of ranks calculation.

2. The method of claim 1, wherein determining traffic speeds comprises estimating existing traffic speeds.

3. The method of claim 1, wherein determining traffic speeds comprises predicting future traffic speeds.

4. The method of claim 1, wherein the steps are carried out in the order recited.

5. A program storage device readable by machine, tangibly embodying a program of instructions executable by the machine for determining traffic speeds related to at least one vehicle traveling in a transportation network, the program of instructions, when executing, performing the following steps:

receiving by the machine a plurality of real-time GPS-based speed records, wherein the real-time GPS-based speed records relate to real-time vehicle speeds in the transportation network;

receiving by the machine a plurality of historical speed records from a secondary source of speed data, wherein the historical speed records relate to historical vehicle speeds in the transportation network and wherein the historical speed records cover a time period;

determining by the machine a first characteristic of real-time GPS-based speed records of a first type;

determining by the machine a second characteristic of real-time GPS-based speed records of a second type, wherein the speed records of the first type indicate a higher speed than the speed indicated by the speed records of the second type;

determining by the machine a third characteristic of a combination of the real-time GPS-based speed records of the first type and the second type;

determining by the machine, for each of a plurality of sub-time periods included in the time period, a fourth characteristic of historical speed records of the first type;

determining by the machine, for each of the plurality of sub-time periods included in the time period, a fifth characteristic of historical speed records of the second type;

determining by the machine, for each of the plurality of sub-time periods included in the time period, a sixth characteristic of a combination of the historical speed records of the first type and the second type; and determining by the machine traffic speeds related to the at least one vehicle traveling in the transportation network from the historical speed records of a selected one of the plurality of sub-time periods, wherein the selected one of the plurality of sub-time periods is chosen as the period in which a combination of the first, second and third characteristics is most similar to a combination of the fourth, fifth and sixth characteristics;

wherein the first characteristic is a count of real-time GPS-based speed records of the first type;

wherein the second characteristic is a count of real-time GPS-based speed records of the second type;

wherein the third characteristic is one of: (a) a ratio of: a count of real-time GPS-based speed records of the first type to a count of real-time GPS-based speed records of the second type; (b) a mean value of a combination of the real-time GPS-based speed records of the first and second types; and (c) a variance value of a combination of the real-time GPS-based speed records of the first and second types;

wherein the fourth characteristic is a count of historical speed records of the first type;

wherein the fifth characteristic is a count of historical speed records of the second type;

wherein the sixth characteristic is one of: (a) a ratio of: a count of historical speed records of the first type to a count of historical speed records of the second type; (b) a mean value of a combination of historical speed records of the first and second types; and (c) a variance value of a combination of historical speed records of the first and second types; and wherein the period in which a combination of the first, second and third characteristics is most similar to a combination of the fourth, fifth and sixth characteristics is determined by utilizing a weighted sum of ranks calculation.

6. The program storage device of claim 5, wherein determining traffic speeds comprises estimating existing traffic speeds.

7. The program storage device of claim 5, wherein determining traffic speeds comprises predicting future traffic speeds.

8. The program storage device of claim 5, wherein the steps are carried out in the order recited.

9. A computer-implemented system for determining traffic speeds related to at least one vehicle traveling in a transportation network, the system comprising:

a receiving element comprising hardware that receives:

(a) a plurality of real-time GPS-based speed records, wherein the real-time GPS-based speed records relate to real-time vehicle speeds in the transportation network; and (b) a plurality of historical speed records from a secondary source of speed data, wherein the historical speed records relate to historical vehicle speeds in the transportation network and wherein the historical speed records cover a time period;

a calculation element comprising hardware in operative communication with the receiving element, wherein the calculation element determines:

(a) a first characteristic of real-time GPS-based speed records of a first type;

(b) a second characteristic of real-time GPS-based speed records of a second type, wherein the speed records of the first type indicate a higher speed than the speed indicated by the speed records of the second type;

(c) a third characteristic of a combination of the real-time GPS-based speed records of the first type and the second type;

(d) for each of a plurality of sub-time periods included in the time period, a fourth characteristic of historical speed records of the first type;

(e) for each of the plurality of sub-time periods included in the time period, a fifth characteristic of historical speed records of the second type;

(f) for each of the plurality of sub-time periods included in the time period, a sixth characteristic of a combination of the historical speed records of the first type and the second type; and (g) traffic speeds related to the at least one vehicle traveling in the transportation network from the historical speed records of a selected one of the plurality of sub-time periods, wherein the selected one of the plurality of sub-time periods is chosen as the period in which a combination of the first, second and third characteristics is most similar to a combination of the fourth, fifth and sixth characteristics; and an output element comprising hardware in operative communication with the calculation element, wherein the output element outputs the determined traffic speeds related to the at least one vehicle traveling in the transportation network from the historical speed records of the selected one of the plurality of sub-time periods;

wherein the first characteristic is a count of real-time GPS-based speed records of the first type;

wherein the second characteristic is a count of real-time GPS-based speed records of the second type;

wherein the third characteristic is one of: (a) a ratio of: a count of real-time GPS-based speed records of the first type to a count of real-time GPS-based speed records of the second type; (b) a mean value of a combination of the real-time GPS-based speed records of the first and second types; and (c) a variance value of a combination of the real-time GPS-based speed records of the first and second types;

wherein the fourth characteristic is a count of historical speed records of the first type;

wherein the fifth characteristic is a count of historical speed records of the second type;

wherein the sixth characteristic is one of: (a) a ratio of: a count of historical speed records of the first type to a count of historical speed records of the second type; (b) a mean value of a combination of historical speed records of the first and second types; and (c) a variance value of a combination of historical speed records of the first and second types; and wherein the period in which a combination of the first, second and third characteristics is most similar to a combination of the fourth, fifth and sixth characteristics is determined by utilizing a weighted sum of ranks calculation.

10. The system of claim 9, wherein determining traffic speeds comprises estimating existing traffic speeds.

11. The system of claim 9, wherein determining traffic speeds comprises predicting future traffic speeds.

12. The system of claim 9, wherein the steps are carried out in the order recited.

13. The system of claim 9, wherein the output element outputs the determined traffic speeds related to the transportation network from the historical speed records of the selected one of the plurality of sub-time periods to at least one of: (a) a display monitor; (b) a digital file; and (c) a printer.

* * * * *